United States Patent [11] 3,607,495

[72] Inventor John G. Davis, Jr.
 Newport News, Va.
[21] Appl. No. 769,592
[22] Filed Oct. 22, 1968
[45] Patented Sept. 21, 1971
[73] Assignee The United States of America as
 represented by the Administrator of the
 National Aeronautics and Space
 Administration

[54] TUBE-FABRICATING PROCESS
 8 Claims, 9 Drawing Figs.
[52] U.S. Cl. .................................................... 156/86,
 156/84
[51] Int. Cl. ...................................................... B29c 27/00
[50] Field of Search ........................................... 156/84, 86

[56] References Cited
 UNITED STATES PATENTS
 3,050,786  8/1962  St. Joan et al. ............. 156/84 X
 3,383,258  5/1968  Houlston ..................... 156/86

Primary Examiner—Carl D. Quarforth
Assistant Examiner—S. R. Hellman
Attorneys—Howard J. Osborn, Wallace J. Nelson and G. T. McCoy ABSTRACT: A method of fabricating uniaxial filament reinforced plastic tubes is disclosed wherein plies of uncured epoxy resin preimpregnated filament sheets are wrapped around a mandrel and a heat-shrinkable sleeve is used to apply pressure against the plies while the epoxy resin is being cured.

PATENTED SEP 21 1971  3,607,495
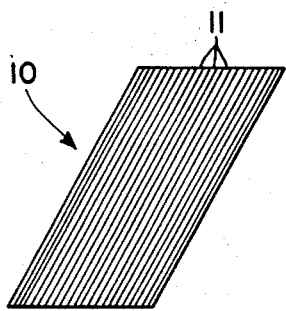
FIG. 1
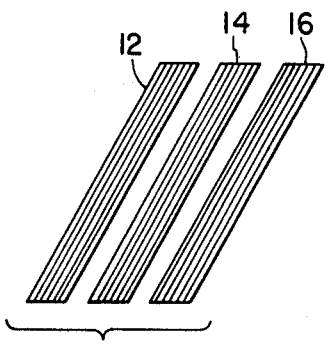
FIG. 2
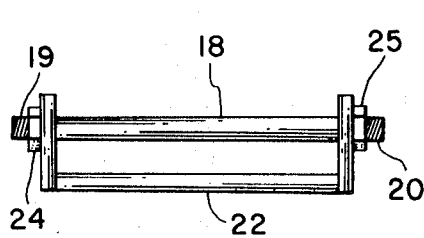
FIG. 3
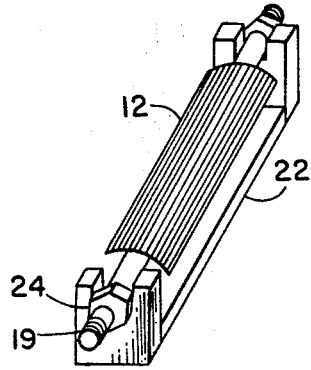
FIG. 4
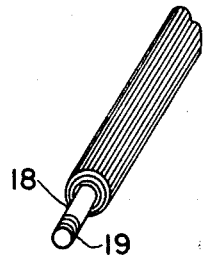
FIG. 5
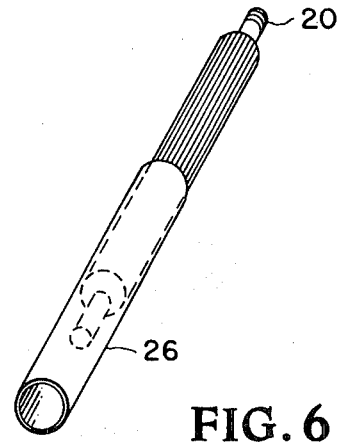
FIG. 6
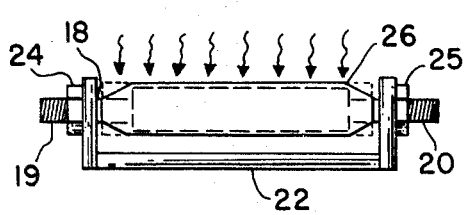
FIG. 7
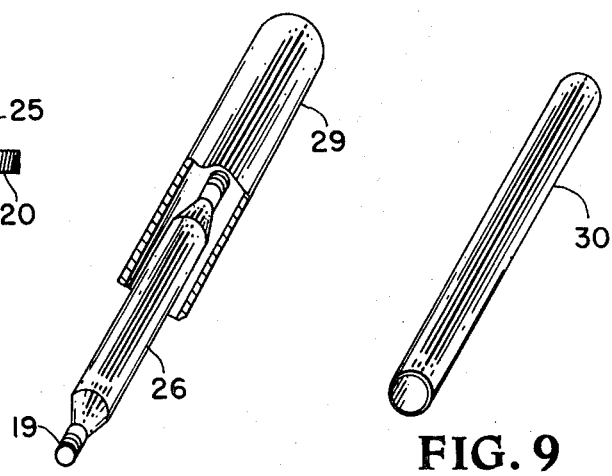
FIG. 8
FIG. 9
INVENTOR.
JOHN G. DAVIS, JR.
BY
ATTORNEYS

TUBE-FABRICATING PROCESS

The invention described herein was made by an employee of the United States Government and may be manufactured and used by or for the Government for governmental purposes without the payment of any royalties thereon or therefor.

This invention relates to a process for fabricating plastic tubes and relates in particular to a novel process for fabricating small plastic tubes having longitudinal filamentary reinforcement wherein the exterior and interior of the tubes are smooth and of suitable quality for use in research and development programs. Previously, plastic tubes with longitudinal filamentary reinforcement were fabricated using a plastic tape, such for example Mylar, wound in a helical pattern over the filament-reinforced plastic plies to apply pressure to the outside surface of the tube. There are obviously disadvantages in this prior art process inasmuch as tubes made utilizing the Mylar tape exhibit a considerable amount of variation in compression strength and the outside surface of the final formed tubes contain ridges where the Mylar tape overlaps. The variation in compressive strength is a result of the void contained between the layers of filament-reinforced plastic. These voids result from inadequate pressure that is applied to the outside surface of the tube by the Mylar tape. The ridges on the outside of the tube must be smooth machined before strain gages can be mounted on the outside of the tube and, in addition, the ridges make it more difficult and time consuming to determine the cross-sectional area of the tube than it would be for the tube with a smooth outside surface. The problem of inadequate pressure being applied to the outside surface of the tube could be overcome by utilizing a vacuum bag, autoclave or hydroclave. However, the use of a vacuum bag, autoclave or hydroclave requires that the tube be enclosed in a flexible airtight bag that can be stretched over the tube without wrinkling. Any wrinkles in the enclosing bag will result in depressions in the surface of the outer tube. There is thus a definite need in the art for a suitable accurate method of fabricating smooth surface longitudinal filamentary reinforced plastic tubes.

Accordingly, it is an object of the present invention to provide a new and novel process for fabricating plastic tubes having filamentary reinforcement.

Another object of the present invention is a method of fabricating smooth surface plastic tubes having longitudinal filamentary reinforcement.

Another object of the present invention is a method of fabricating smooth surface plastic tubes having helical filamentary reinforcement.

Another object of the present invention is the novel method of providing a smooth surface to laminated plastic tubes.

Yet another object of the present invention is to provide a novel method of compressing the plies of a laminated plastic tube during curing of the plastic in such a manner that a smooth exterior surface finish is obtained.

According to the present invention the foregoing and other objects are obtained in the following manner utilizing a sheet of epoxy resin having long filaments of reinforcement material preimpregnated therein with the filaments arranged in strips equal in number to the number of plies desired for the tube to be fabricated. The first strip is cut to a width equal to the circumference of the mandrel on which the tube is to be formed plus one-sixteenth of an inch for overlap. The width of each succeeding strip is such that one-sixteenth of an inch overlap is maintained. A suitable mandrel, for example a Teflon rod, is placed in a support jig and the strips of filament reinforced epoxy resin wrapped sequentially around the rod with the overlap layer of each strip being staggered with respect to the overlap layer in the preceding strip. As an example, the overlap layers in a tube containing four strips or layers of filament-reinforced epoxy resin would be located at the 0°, 90°, 180° and 270° stations about the tube. After the strips are laid on the mandrel a sleeve of polytetrafluoroethylene, or Teflon, or other suitable heat-shrinkable material is slipped over the mandrel and filament reinforced plastic with heat then being applied to shrink the sleeve into tight engagement with the filament-reinforced plastic and mandrel. The assembly (mandrel, filament-reinforced plastic, and Teflon sleeve) is then placed inside a steel tube to hold the mandrel straight while the plastic is being cured. The steel tube containing the assembly is placed in a circulating-air oven and heated at an elevated temperature for a sufficient length of time to cure the epoxy employed in the plies. After cooling to room temperature, the assembly is removed from the steel tube, the heat-shrinkable Teflon sleeve is removed and the mandrel is extracted from the filament reinforced tube.

A more complete appreciation of the invention and many of the attendant advantages thereof will be readily apparent as the same becomes better understood by reference to the following detailed description when considered in connection with the accompanying drawings wherein:

FIG. 1 is a view of a filament-reinforced epoxy resin sheet in an uncured condition;

FIG. 2 is a view of strips of material cut from the sheet shown in FIG. 1;

FIG. 3 is a view of the mandrel and support jig;

FIG. 4 is a view similar to FIG. 3 and showing one layer or ply of filament-reinforced plastic being wrapped around the mandrel;

FIG. 5 is a view of the mandrel removed from the support jig and containing a plurality of plies of the filament-reinforced material;

FIG. 6 is a view of the heat shrinkable sleeve being slipped over the filament-reinforced plastic;

FIG. 7 shows the mandrel in place in the support jig with heat being applied to the heat-shrinkable sleeve;

FIG. 8 shows the mandrel and assembly of FIG. 7 being slipped into a steel tube for curing; and FIG. 9 shows the final recovered filament reinforced plastic tube.

Referring now more particularly to the drawings wherein like reference numerals designate identical parts throughout the several views, there is shown in FIG. 1 a sheet 10 of uncured epoxy resin having a plurality of parallel long filament-reinforced material therein and designated by reference numeral 11. Sheet 10 is cut into a plurality of strips 12, 14, 16 and others, not shown, (FIG. 2) with the width of the first strip being equal to desired internal diameter of the tube to be fabricated which is also equal to the circumference of the mandrel on which the tube is to be formed, plus one-sixteenth of an inch. The width of each succeeding strip is such that one-sixteenth of an inch overlap is maintained in all plies or layers. The filaments 11 in each strip are alined parallel to the longitudinal direction of the strip in the embodiment illustrated.

Referring now more particularly to FIGS. 3 and 4, a suitable mandrel, for example a polytetrafluorethylene or Teflon rod 18, having threaded ends 19 and 20 is used for assembling the strips shown in FIG. 2. Mandrel 18 is positioned within a support jig 22 and suitable nuts 24 and 25 are screwed onto ends 19 and 20, respectively, and tightened against each end of support jig 22 so that the rod 18 is under tension. This tension is required to keep the mandrel straight while the filament-reinforced plastic sheet is being laid on the mandrel.

The individual strips 12, 14 and 16 and others not shown, are then sequentially wrapped onto mandrel 18 with the overlap area in each strip being staggered with respect to the overlap area in the preceding strip on the mandrel. For example, the overlap areas in a tube containing four strips of plies of filament-reinforced plastic material would be located at the 0°, 90°, 180° and 270° stations. After the strips are all wrapped in position mandrel 18 is removed from support jig 22 and a heat-shrinkable polytetrafluoroethylene sleeve 26 is slidably positioned over mandrel 18 and the filament reinforced plastic plies (FIG. 6). Sleeve 26 is relatively thin and its internal diameter is such that it can just be slipped over the plies of material wrapped around mandrel 18 without damaging the filament alinement. Mandrel 18 is then placed in support jig 22 and tension is applied to the mandrel by tightening nuts 24 and 25. Next, heat is applied with a handheld electric heat gun to shrink the Teflon tubing on the filament-reinforced plastic and mandrel. Shrinkage occurs instantly at exposure to 350° F. with partial shrinkage occuring at exposure as low as 200° F. Due to the inherent physical characteristics of polytetrafluorethylene, sleeve 26 will shrink to tightly engage the plies of material on mandrel 18 with the ends of sleeve 26 shrinking further to tightly engage with mandrel 18 as shown more particularly in FIG. 8. Another function of heat-shrinkable sleeve 26 is to squeeze out any air entrapped between plies of the sheet material.

This assembly, that is, mandrel 18, the filament-reinforced plastic plies and Teflon sleeve 26, is then removed from support jig 22 and placed inside a snug-fitting steel tube 29 (FIG. 8). The purpose of steel tube 29 is to hold the assembly straight while the plastic of the individual plies is being cured in an oven. The steel tube containing the assembly is then placed in a conventional circulating-air oven, not shown, and heat applied for a sufficient length of time to cure the plastic. After cooling to room temperature the assembly is removed from steel tube 29, heat-shrinkable sleeve 26 is peeled from the filament-reinforced plastic and mandrel 18 is extracted from the filament-reinforced tube to leave a final filament-reinforced tube 30 having smooth exterior and interior surfaces (FIG. 9).

The process described hereinbefore is adaptable for production of plastic tubes reinforced with filaments that are alined in a uniaxial direction although it is readily apparent that plastic tubing reinforced with filaments that are helically alined or in any other direction can be readily made by using this process. In addition, metal tubes reinforced with filament-reinforced plastic can be made using the hereinbefore-described process by letting the metal tube serve as the mandrel.

Although no specific materials have been mentioned for fabricating the filament-reinforced plastic tubes of the present invention, it is readily apparent that any suitable preimpregnating material and any suitable and conventional filament reinforcement may be used. The material properties and cure cycle for two specific systems utilizing preimpregnated boron and glass fibers are set forth in the table below.

| Reinforcing filament | Boron[1] | S-glass |
|---|---|---|
| Resin system | 1031/828/MNA BDMA* | XP-251S** |
| Resin content, % by weight | 29±3 | 25±3 |
| Cloth backing | 104 glass scrim | None |
| Nominal thickness per ply, in. | 0.005-0.006 | 0.0075 |
| Cure cycle | 1 hr. at 180° F. plus 3 hr. at 350° F. | 12 hr. at 300° F. |

[1] The baron filaments employed in this example were manufactured by Texaco Experiment, Inc., Richmond, Virginia, and were formed to .004 in. diameter by vapor depositing boron on .0005 in. diameter tungsten wire. These filaments were preimpregnated with the resin system noted in a conventional manner with the resin being cured to the stage "B" condition. Other suitable boron filaments may be purchased from AVCO Corp., and United Aircraft. Also prepreg tape of boron/epoxy may be purchased from the Minnesota Mining and Manufacturing Co., Aerojet General, Hercules, and Boeing Commercial Airplane Division.

*1031/828/MNA/BDMA refers to a 50-50 mixture of Epon 1031 and Epon 828, trade name epoxy resins available from the Shell Chemical Company and as described, respectively, in Company Product Specifications dated May 1962 and Data Sheet dated July 1962. (The U.S. Polymeric Company also sells these resins premixed 50-50 as E787.) MNA and BDMA refer, respectively, to Nadic Methyl Anhydride and Benzylidimethylamine, curing agents for the resins.

**XP-251S or "Scotchply" XP-251S is a high strength unidirectional prepreg tape made with epoxy resin and reinforced with S-901 Glass sold by the Minnesota Mining and Manufacturing Co. and further described in Technical Data Sheet #3 dated June 13, 1966.

The specific materials described hereinabove are cited for illustrative purposes only and are not to be considered limiting on the present invention, it being readily understood that different epoxy resins or other thermosetting plastic materials may be utilized and that filaments for the reinforcement may be materials other than boron or glass.

Tubes manufactured by the process described herein are essentially void-free and exhibit less dimensional variation than the tolerances set for commercially available le extruded aluminum tubing. Other advantages of the present process over the prior art processes are believed apparent and include a higher value of compression strength, less variation in compressive strength between the various tubes and a smooth outside and inside surface which permits ready attachment of strain gages or the like to the tube surfaces.

Short sections of tubing, 1.5 inch to 3.0 inch long, produced by the described process, have been tested in axial compression. Before testing, each end of the specimen was machined flat, square and parallel. In order to prevent "brooming" of the ends, stainless steel end plugs were bonded to each end of the specimen with a suitable conventional room temperature curing epoxy resin. The diameter and thickness of the end plugs was 1.0 inch and 0.25 inch, respectively. The machine groove in the end plug in which the tube was bonded was 0.125-inch deep and wide enough to permit at least 0.010-inch clearance on the inside and outside of the tube. The compression load was applied by the upper and lower platens of a conventional hydraulic testing machine. Prior to testing, the platens were alined parallel to the end plugs so the uniform loading over the specimen ends would be approached. The specimen was loaded continuously at a strain rate of 0.001 per minute until failure. Strain and overall shortening were measured using strain gages and a linear direct current differential transformer, respectively. In the boron-epoxy tubes tested, failure occurred by buckling or breaking of the boron filaments. Compression strength for the boron-epoxy tubes tested ranged from 287 k.s.i. to 324 k.s.i. with an average of 309 k.s.i. Filament stress at failure averages approximately 618 K s.i. In the S-glass-epoxy tubes failure also occurred by buckling or breaking of the reinforcing filaments. Based on 17 tests, compressive strength for the S-glass-epoxy tubes ranged from 172 k.s.i. with an average of 207 k.s.i. The average compressive stress in the glass filaments at failure was approximately 345 k.s.i.

There are obviously many modifications and variations of the present invention possible in the light of the above teachings. For example, other materials may be substituted for the polytetrafluoroethylene mandrel and heat-shrinkable sleeve employed with the important criteria being that the material selected must not react chemically with the epoxy resin and must not become physically bonded to the tube being formed. There are other obvious variations that will be readily apparent to those skilled in the art and it is to be understood that within the scope of the appended claims the invention may be practiced otherwise than as specifically described.

What is claimed as new and desired to be secured by Letters Patent of the United States is:

1. A method of fabricating filamentary reinforced plastic tubes comprising the steps of:
   1. providing a sheet of filament-reinforced epoxy resin material in uncured condition,
   2. providing a rigid mandrel in a support jig, said mandrel having an external diameter equal to the desired internal diameter of the tube to be fabricated,
   3. cutting a plurality of strips of material from said sheet, the first of said strips being equal in width to the desired inside diameter of the tube to be fabricated plus approximately 1/16-inch overlap each additional strip cut being of a width equal to the immediate preceding strip cut plus one-sixteenth inch so as to provide an overlap area when said strips are positioned successively on said mandrel and wherein the filaments in said strips are alined parallel to the longitudinal direction of the strip,
   4. wrapping successive strips of material obtained from step (3) onto said mandrel with the overlap area in each succeeding strip after the first being spaced from the overlap area of the preceding strips,
5. removing said mandrel and wrapped strips from said jig and slidably positioning a heat-shrinkable polytetrafluorethylene sleeve over said wrapped strips,
6. repositioning said mandrel, wrapped strips and sleeve structure in the jig,
7. heating said structure to shrink said heat-shrinkable sleeve so as to tightly engage said wrapped strips,
8. removing the resulting structure from said jig and slidably positioning a steel tube therearound,
9. placing the steel tube containing the assembly in a heated circulating-air oven to cure the filament-reinforced plastic,
10. cooling the assembly to room temperature, and
11. recovering a cured filament-reinforced plastic tube by removing the steel tube, heat-shrinkable plastic sleeve and the mandrel from the cured plastic tube.

2. The method of claim 1 wherein four of said strips of material are employed to make said tube and the overlap of said strips are disposed 90° from each other about said mandrel.

3. The method of claim 1 wherein said filaments are boron.

4. The method of claim 3 wherein the curing time for said epoxy resin is 1 hour at 180° F. and 3 additional hours at 350° F.

5. The method of claim 1 wherein said filaments are glass fibers.

6. The method of claim 5 wherein said cure time for said epoxy resin is 12 hours at 300° F.

7. A method of fabricating uniaxial filament reinforced plastic tubes comprising the steps of:

1. cutting and alining a strip of epoxy preimpregnated filaments around a polytetrafluoroethylene mandrel with the filaments being disposed parallel to the longitudinal axis of said mandrel, said strip being equal in width to the circumference of the mandrel plus 1/16-inch overlap,
2. repeating the cutting and aligning step until the desired tube thickness is obtained by adding succeeding strips or plies with the width of each succeeding strip being such that approximately 1/16-inch overlap is maintained for each ply and each overlap area in the various plies being spaced around the circumference of the mandrel so as to approach uniform wall thickness for the tube being formed,
3. slidably positioning a heat-shrinkable sleeve over the mandrel and plies of preimpregnated filaments,
4. heat shrinking said sleeve so as to tightly engage said preimpregnated plies and to serve as a mold which forms a smooth outer surface for the filament-reinforced tube,
5. placing the resulting assembly in a straight snug-fitting steel tube to prevent the mandrel from sagging while
6. curing the epoxy resin in an elevated temperature circulating-air oven,
7. cooling to room temperature, removing the assembly from the steel tube, peeling the heat-shrinkable sleeve from the assembly, extracting said mandrel, and
8. recovering a smooth surface, uniaxial filament-reinforced plastic tube.

8. The method of claim 7 wherein said heat-shrinkable sleeve is a polytetrafluoroethylene chemically inert with respect to said epoxy and said epoxy preimpregnated filaments are selected from boron and glass fibers.